(12) United States Patent
Cho

(10) Patent No.: US 10,541,452 B2
(45) Date of Patent: Jan. 21, 2020

(54) BATTERY PACK INCLUDING CIRCUIT BOARD HAVING PROTRUDING SURFACE

(71) Applicant: SAMSUNG SDI CO., LTD., Yongin-si, Gyeonggi-do (KR)

(72) Inventor: Mansik Cho, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 60 days.

(21) Appl. No.: 15/440,006

(22) Filed: Feb. 23, 2017

(65) Prior Publication Data

US 2017/0271721 A1  Sep. 21, 2017

(30) Foreign Application Priority Data

Mar. 21, 2016 (KR) .................. 10-2016-0033490

(51) Int. Cl.
| | | |
|---|---|---|
| *H01M 10/42* | (2006.01) | |
| *H01M 2/20* | (2006.01) | |
| *H01M 2/26* | (2006.01) | |
| *H01M 10/46* | (2006.01) | |
| *H02J 7/00* | (2006.01) | |

(52) U.S. Cl.
CPC ......... *H01M 10/425* (2013.01); *H01M 2/202* (2013.01); *H01M 2/26* (2013.01); *H01M 10/46* (2013.01); *H02J 7/0013* (2013.01); *H02J 7/0042* (2013.01); *H01M 2010/4271* (2013.01)

(58) Field of Classification Search
CPC ................................................. H01M 10/425

USPC .................................................. 320/128, 112
See application file for complete search history.

(56) References Cited

U.S. PATENT DOCUMENTS

| | | | |
|---|---|---|---|
| 8,278,877 B2 * | 10/2012 | Murayama .......... | H01M 2/1022 320/112 |
| 9,088,038 B2 | 7/2015 | Park | |
| 2009/0061302 A1 * | 3/2009 | Scott ...................... | H01M 2/105 429/160 |
| 2011/0151285 A1 * | 6/2011 | Hong .................... | H01M 2/105 429/7 |
| 2012/0129040 A1 | 5/2012 | Hwang | |
| 2013/0011700 A1 * | 1/2013 | Park ..................... | H01M 2/1077 429/7 |
| 2013/0266823 A1 * | 10/2013 | Lee ......................... | H01M 2/34 429/7 |
| 2014/0342191 A1 * | 11/2014 | Shin .................. | H01M 10/4257 429/7 |
| 2015/0037636 A1 * | 2/2015 | Amsler ................ | A61N 1/3975 429/90 |

FOREIGN PATENT DOCUMENTS

| | | |
|---|---|---|
| KR | 10-2011-0054662 A | 5/2011 |
| KR | 10-2012-0054337 A | 5/2012 |

* cited by examiner

*Primary Examiner* — Jerry D Robbins
(74) *Attorney, Agent, or Firm* — Lee & Morse, P.C.

(57) ABSTRACT

A battery pack includes a plurality of batteries including a first battery and a second battery, and a circuit board including a main surface and a protruding surface extending from the main surface, the main surface being located at one surface of the first battery and the protruding surface being located at the second battery. The second battery is electrically connected to the circuit board through the protruding surface.

20 Claims, 8 Drawing Sheets

BATTERY PACK INCLUDING CIRCUIT BOARD HAVING PROTRUDING SURFACE

CROSS-REFERENCE TO RELATED APPLICATION

Korean Patent Application No. 10-2016-0033490, filed on Mar. 21, 2016, in the Korean Intellectual Property Office and entitled: "Battery Pack," is incorporated by reference herein in its entirety.

BACKGROUND

1. Field

Embodiments relate to a battery pack, for example, to a battery pack including a secondary battery.

2. Description of the Related Art

Generally, a secondary battery is a battery capable of being repeatedly charged and discharged. The secondary battery may be charged by using, as an energy source, not only an existing electric power system, such as a power plant, but also renewable energy, such as solar energy. Such a secondary battery may be used as an energy source for an electric device, such as a mobile phone, a laptop computer, and a camcorder, and also for large equipment that requires a relatively large amount of power, such as a car.

A plurality of secondary batteries may be connected in series and/or in parallel to provide high output or high capacity. The battery pack may further include a controller for controlling charging and/or discharging of secondary batteries and preventing over-charging and/or over-discharging.

SUMMARY

Embodiments are directed to a battery pack, including a plurality of batteries including a first battery and a second battery, and a circuit board including a main surface and a protruding surface extending from the main surface, the main surface being located at one surface of the first battery and the protruding surface being located at the second battery. The second battery is electrically connected to the circuit board through the protruding surface.

The battery pack may further include a connection lead tab electrically connecting a first electrode of the second battery to another one of the plurality of batteries, and a second electrode lead tab connected to a second electrode of the second battery. At least one of the connection lead tab and the second electrode lead tab may be electrically connected to the protruding surface.

The battery pack as claimed in claim 1, further including a first holder accommodating the first battery, and a second holder accommodating the second battery. The circuit board may be fixed to the first holder.

The circuit board may be fixed to the first holder via a surface opposite to a surface to which the first battery is fixed.

The first holder may include a board fixing portion combined with the main surface of the circuit board.

The circuit board may include a circuit to control at least one of charging and discharging of the plurality of batteries.

Embodiments are also directed to a battery pack including a plurality of batteries including a first battery, a second battery, and a third battery, which are electrically connected to each other, and a circuit board including a main surface and a protruding surface extending from the main surface, the main surface being located at one surface of the first battery and the protruding surface being located at the second battery. The second battery may be electrically connected to the circuit board through the protruding surface.

The battery pack may further include a first connection lead tab connecting a second electrode of the first battery and a first electrode of the third battery, and a second connection lead tab connecting a first electrode of the second battery and a second electrode of the third battery. The first connection lead tab may be electrically connected to the main surface of the circuit board. The second connection lead tab is electrically connected to the protruding surface of the circuit board.

The battery pack may further include an electrode lead tab connected to a second electrode of the second battery. The electrode lead tab may be electrically connected to the protruding surface of the circuit board.

The first connection lead tab may include a lead body folded in half to have one end portion fixed to the second electrode of the first battery and another end portion fixed to the first electrode of the third battery, an extending portion that extends from the lead body, and a bent portion that is bent from end portion of the extending portion and inserted into the main surface of the circuit board.

The battery pack may further include a housing accommodating the plurality of batteries and the circuit board. The housing may include a first surface facing the circuit board, the first surface being parallel to the circuit board.

The housing may further include a second surface facing the second battery, the second surface being located at a side of the first surface.

The housing further may include a second surface facing the second battery. The second surface of the housing may include a curved surface externally protruding higher than a height of the first surface.

The curved surface of the second surface of the housing may be parallel to a surface of the second battery that faces the curved surface.

The battery pack may further include a first holder accommodating the first battery, and accommodating the circuit board at a surface opposite to a surface where the first battery is accommodated, and a second holder accommodating the second battery, and accommodating the third battery at a surface opposite to a surface where the second battery is accommodated. The housing may further include a base facing the first battery and the third battery.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
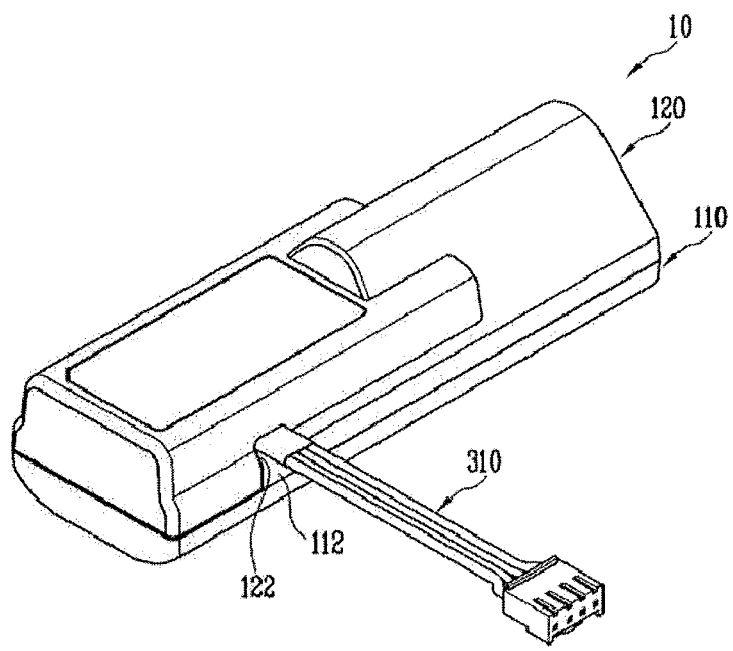
FIG. 1 illustrates a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
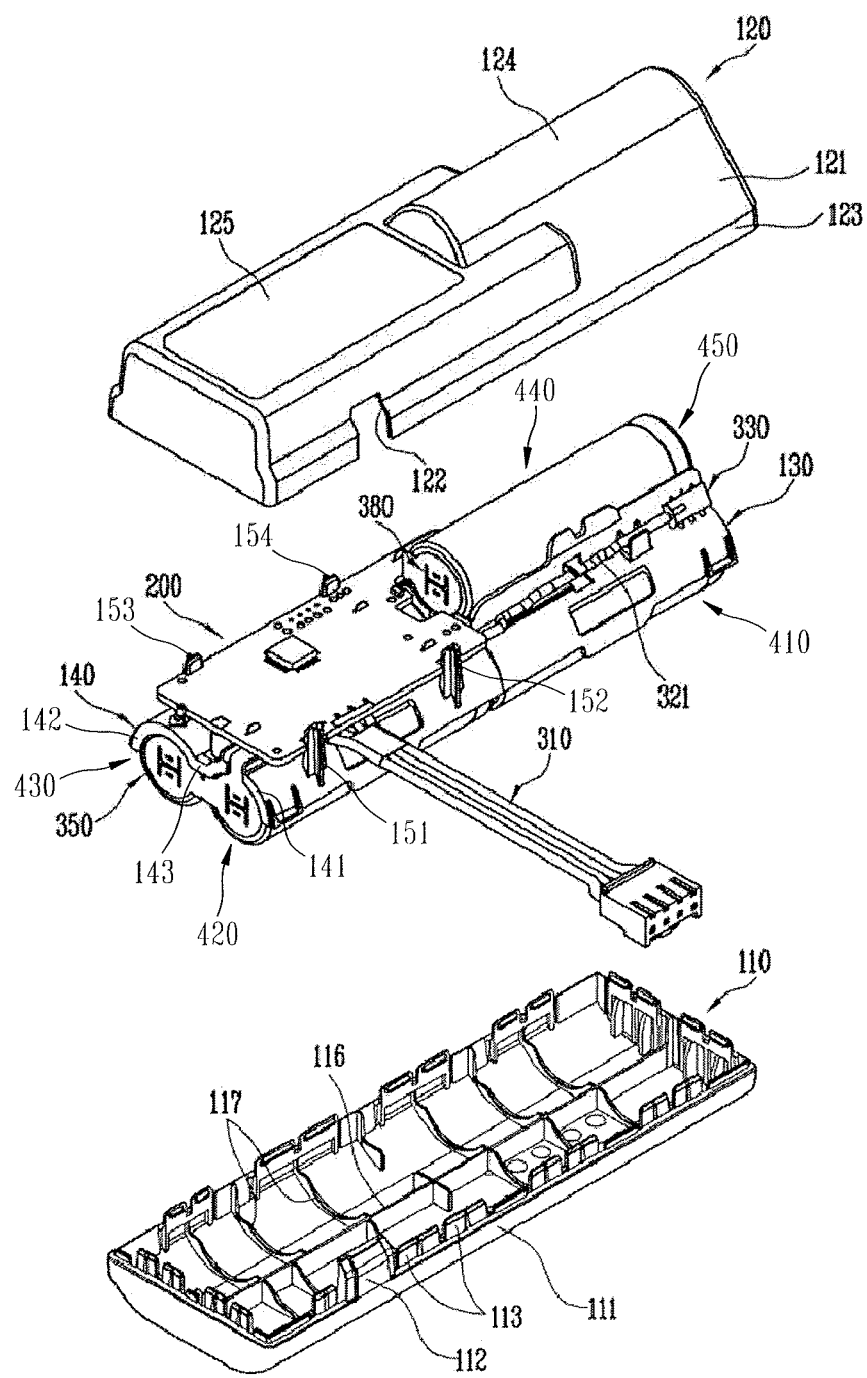
FIG. 2 illustrates an exploded perspective view of the battery pack of FIG. 1.
Figure 3:
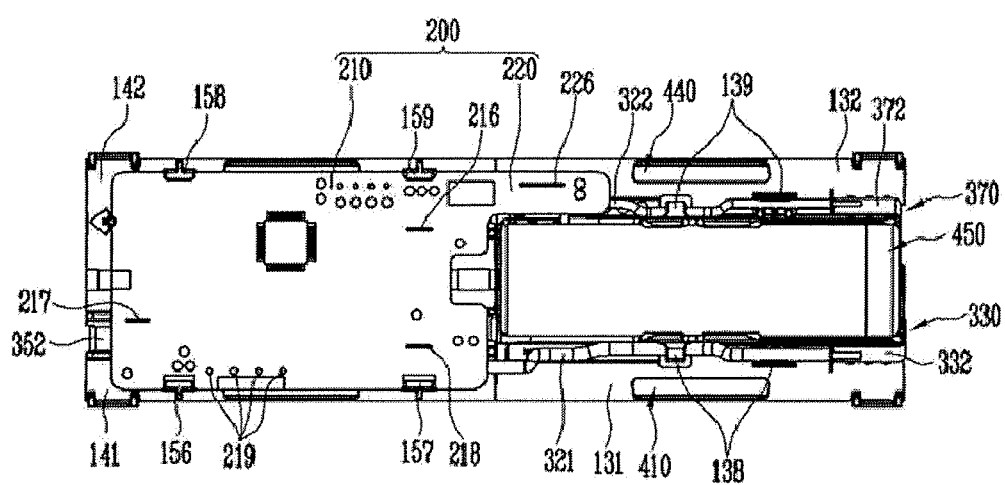
FIG. 3 illustrates a top view of a battery assembly to which a circuit board of FIG. 2 is fixed.
Figure 4:
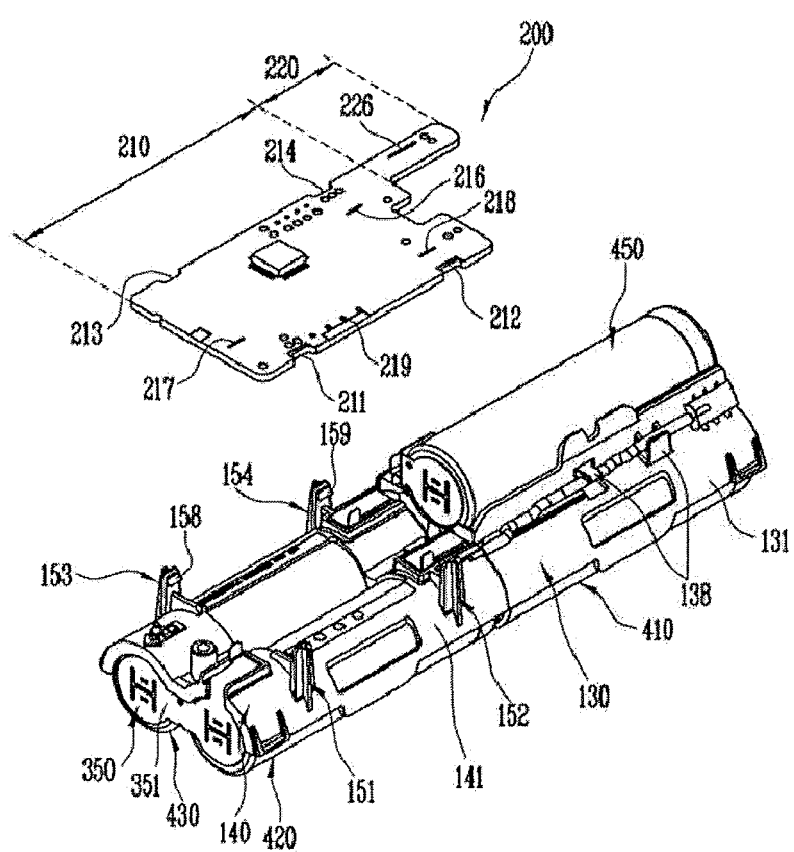
FIG. 4 illustrates a perspective view of the battery assembly of FIG. 3.
Figure 5:
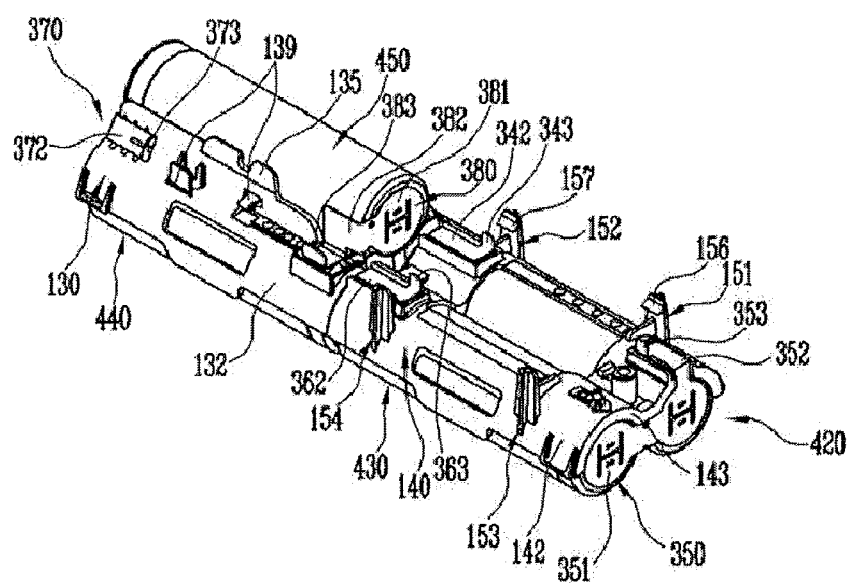
FIG. 5 illustrates a rear perspective view of the battery assembly of FIG. 4.
Figure 6:
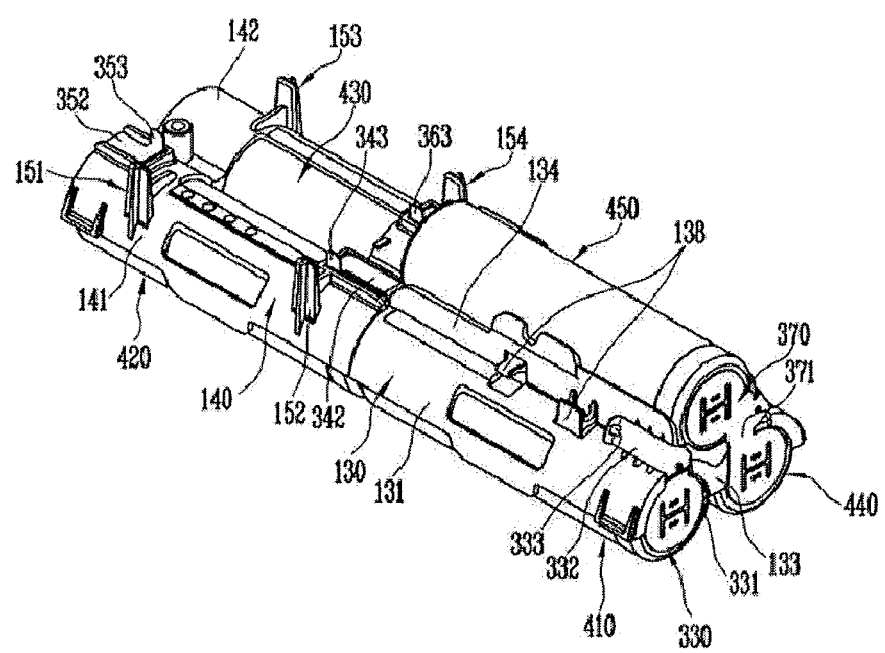
FIG. 6 illustrates a lateral perspective view of the battery assembly of FIG. 4.

FIG. 1 illustrates a perspective view of a battery pack according to an embodiment, FIG. 2 illustrates an exploded perspective view of the battery pack of FIG. 1, and FIG. 3 illustrates a top view of a battery assembly to which a circuit board 200 of FIG. 2 is fixed. FIG. 4 illustrates a perspective view of the battery assembly of FIG. 3, FIG. 5 illustrates a rear perspective view of the battery assembly of FIG. 4, and FIG. 6 illustrates a lateral perspective view of the battery assembly of FIG. 4.

The battery pack 10 according to an embodiment includes housings 110 and 120, a plurality of battery holders 130 and 140, a plurality of batteries 410 through 450, a circuit board 200, and a connector 310 electrically connected to the circuit board 200 and extending externally from the battery pack 10.

The housings 110 and 120 may include a base 110 on which a battery assembly is mounted, and a housing cover 120 combined to the base 110 and covering the battery assembly. The battery assembly will be described below.

A body 111 of the base 110 may have an approximate box shape having an opened top. The base 110 may include an opening cap 112 partially closing an opening 122 through which the connector 310 penetrates.

A plurality of ribs 117 supporting the batteries 410 through 440 may protrude upwardly from an inner button surface of the base 110. The plurality of ribs 117 may have a concave top portion such that a side surface of a battery having a cylindrical shape may be mounted thereon. The base 110 may further include a crossing wall 116 that crosses the plurality of ribs 117 along length directions of the batteries 410 through 440.

A body 121 of the housing cover 120 may have an approximate box shape having an opened bottom such that an internal space is provided when the housing cover 120 is combined with the base 110. A top surface of the housing cover 120 may include a first surface 125 and a second surface 124.

The first surface 125 of the housing cover 120 may be a face corresponding to a main surface 210 of the circuit board 200. The first surface 125 may be approximately flat along a top silhouette of the circuit board 200. The first surface 125 may be parallel to the main surface 210 of the circuit board 200, the main surface 210 of the circuit board 200 facing the first surface 125.

The plurality of batteries 410 through 450 may include a first battery 430, a second battery 450, a third battery 440, a fourth battery 420, and a fifth battery 410. The first battery 430, the second battery 450, the third battery 440, the fourth battery 420, and the fifth battery 410 may be secondary batteries that are chargeable and dischargeable multiple times.

The second surface 124 of the housing cover 120 may face the second battery 450. The second surface 124 may be located next to the first surface 125. The second surface may protrude convexly higher than a height of the first surface 125. The second battery 450 may have a cylindrical shape, and a protruding portion of the second surface 124 may include a partially convex surface along a silhouette of the second battery 450 having the cylindrical shape. A curved portion of the second surface 124 may be parallel to the second battery 450.

An edge of the base 110 and an edge 123 of the housing cover 120 may be combined to each other using a hook. For example, the edge of the base 110 may include a plurality of combining ribs 113, and the housing cover 120 may include a groove or a stepped portion on an inner surface of the edge 123, such that the groove or stepped portion may be engaged to the combining ribs 113. The combining ribs 113 may have a shape in which a hook is formed externally.

In some implementations, a combining rib may be provided at the edge 123 of the housing cover 120, and a groove or a stepped portion may be formed on an inner surface of the edge of the base 110. In some implementations, the base 110 and the housing cover 120 may be combined to each other using another coupling device, such as a screw, instead of the hook.

The opening 122 may be formed in the edge 123 of the housing cover 120, and the connector 310 may externally extend through the opening 122.

The number and connecting method of batteries may be variously selected. For example, in an embodiment, five batteries are connected to each other in series. According to an embodiment, at least two batteries may be used, wherein one battery is located on a main surface of a circuit board and another battery is located on a protruding surface of the circuit board. The battery located on the protruding surface of the circuit board may be electrically connected to the circuit board through the protruding surface. In another embodiment, the at least two batteries may be connected in parallel.

Each of the plurality of batteries 410 through 450 may be formed by sealing an electrode assembly and an electrolyte together in a can having a cylindrical shape. The electrode assembly may include a first electrode plate, a second electrode plate, and a separator between the first and second electrode plates. The plurality of batteries 410 through 450 may be any type of battery as long as electrochemical energy is generated according to a reaction of an electrolyte. The type of battery may be, for example, a lithium polymer battery or a lithium ion battery.

For convenience of description, portions of each of the plurality of batteries 410 through 450 that are directly connected to a lead tab will be referred to as two longitudinal end portions, and a curved surface between the two longitudinal end portions will be referred to as a side surface. One of the two longitudinal end portions may be a first electrode terminal and the other longitudinal end may be a second electrode terminal.

The plurality of battery holders 130 and 140 may accommodate the plurality of batteries 410 through 450. The plurality of battery holders 130 and 140 include a first holder 140 accommodating the first battery 430 and the fourth battery 420, and a second holder 130 accommodating the second battery 450, the third battery 440, and the fifth battery 410.

The first holder 140 may include a first battery accommodating portion 142 to which the first battery 430 is combined, and a fourth battery accommodating portion 141 to which the fourth battery 420 is combined. The first holder 140 may include a plurality of board fixing portions 151 through 154 that fix the circuit board 200. In some implementations, the fixing portions 151 through 154 may couple with coupling portions 211 through 214 of the circuit board 200 (see FIG. 4).

Referring to FIG. 2, the first battery 430 and the fourth battery 420 may be combined to a surface of the first holder 140 that faces the base 110. The circuit board 200 may be located on a surface of the first holder 140 that faces the housing cover 120. For convenience of description, the surface facing the base 110 will be referred to as a bottom surface of the first holder 140, and the surface facing the housing cover 120 will be referred to as a top surface of the first holder 140.

The first battery accommodating portion 142 may include a concavely curved inner surface such that a side surface of the first battery 430 is partially surrounded by at least 180° therearound. The first battery 430 may be forcibly fit into the first battery accommodating portion 142. The fourth battery accommodating portion 141 may also include a concavely curved inner surface such that a side surface of the fourth battery 420 is partially surrounded by at least 180° therearound. The fourth battery 420 may be forcibly fit into the fourth battery accommodating portion 141.

The first and fourth batteries 430 and 420, which are accommodated in the first holder 140, may be parallel to each other. The first and fourth batteries 430 and 420 may be supported by the plurality of ribs 117 of the base 110.

Two end portions of the first battery accommodating portion 142 and two end portions of the fourth battery accommodating portion 141 may be connected to each other by a connector 143, in a length direction. An intermediate portion surrounded by the first battery accommodating portion 142, the connector 143, and the fourth battery accommodating portion 141 may be cut such that a side surface of the first battery 430 and a side surface of the fourth battery 420 are partially exposed through the intermediate portion. (See FIG. 6.)

The plurality of board fixing portions 151 through 154 may be provided at the top surface of the first holder 140. The plurality of board fixing portions 151 through 154 may extend upwardly, and may be combined to the main surface 210 of the circuit board 200. The number of board fixing portions may vary. For example, as shown in FIG. 2, four board fixing portions 151 through 154 may be used.

The plurality of board fixing portions 151 through 154 may include four board fixing portions having approximately a rod shape. The board fixing portions 151 and 152 may be located at the top surface of the fourth battery accommodating portion 141, and the board fixing portions 153 and 154 may be located at the top surface of the first battery accommodating portion 142.

The plurality of board fixing portions 151 through 154 may extend upwardly from the top surface of the first holder 140 and may meet an edge of the main surface 210 of the circuit board 200. The board fixing portions 151 and 152 located at the top surface of the fourth battery accommodating portion 141, and the board fixing portions 153 and 154 located at the top surface of the first battery accommodating portion 142 may be arranged at intervals of about a width of the main surface 210 of the circuit board 200. The main surface 210 of the circuit board 200 may be fixed therebetween. The term "width direction of the main surface 210 of the circuit board 200" refers to a direction parallel to a width direction of the first battery 430 and perpendicular to a length direction of the first battery 430.

The plurality of board fixing portions 151 through 154 may respectively include hooks 156 through 159 (see FIG. 3) at regions contacting the edge of the main surface 210 of the circuit board 200 so as to fix the circuit board 200 to the board fixing portions 151 through 154. The plurality of board fixing portions 151 through 154 may further include a support rib horizontally extending inwardly so as to support the bottom surface of the circuit board 200 (see FIG. 4). The plurality of board fixing portions 151 through 154 may further include a reinforcing rib extending along an outer surface such that the rod shape thereof is not bent but is maintained (see FIG. 4).

The circuit board 200 may include a protruding portion 220 that protrudes from the main surface 210 of the circuit board. For example, the protruding portion 220 may be in a same plane as the main surface 210 and may extend along a side of the second battery 450.

The second holder 130 may include second battery accommodating portions 134 and 135 (see FIG. 6 and FIG. 5) to which the second battery 450 is combined, a third battery accommodating portion 132 (see FIG. 5) to which the third battery 440 is combined, and a fifth battery accommodating portion 131 (see FIG. 6) to which the fifth battery 410 is combined.

Referring to FIG. 2, the third and fifth batteries 440 and 410 may be combined to a surface of the second holder 130 that faces the base 110. The second battery 450 may be combined to a surface of the second holder 130 that faces the housing cover 120. For convenience of description, the surface facing the base 110 will be referred to as a bottom surface of the second holder 130, and the surface facing the housing cover 120 will be referred to as a top surface of the second holder 130.

The third battery accommodating portion 132 (see FIG. 5) includes a concavely curved inner surface such that a side surface of the third battery 440 is partially surrounded by at least 180° therearound. The third battery 440 may be forcibly fit into the third battery accommodating portion 132. The fifth battery accommodating portion 131 (see FIG. 6) may include a concavely curved inner surface such that a side surface of the fifth battery 410 is partially surrounded by at least 180° therearound. The fifth battery 410 may be forcibly fit into the fifth battery accommodating portion 131.

The third battery accommodating portion 132 (see FIG. 5) and the fifth battery accommodating portion 131 (see FIG. 6) may be connected by a connector 133 (see FIG. 6). The second battery accommodating portions 134 and 135 (see FIG. 6 and FIG. 5) may be provided at the top surface of the second holder 130. The second battery accommodating portions 134 and 135 (see FIG. 6 and FIG. 5) may be provided such that the second battery 450 is located at a sunken region between the third and fifth battery accommodating portions 132 and 131 (see FIG. 5 and FIG. 6), and may include a concavely curved inner surface such that a side surface of the second battery 450 is partially surrounded by at least 180°. The second battery 450 may be forcibly fit into the second battery accommodating portions 134 and 135 (see FIG. 6 and FIG. 5).

The third and fifth batteries 440 and 410 accommodated in the second holder 130 may be provided in parallel to each other. The third and fifth batteries 440 and 410 may be supported by the plurality of ribs 117 of the base 110. The second battery 450 may be accommodated in a sunken space between the third and fifth batteries 440 and 410.

According to such a structure, the plurality of batteries 410 through 450 may be compactly arranged, and thus the battery pack 10 may be miniaturized.

The first battery 430, the second battery 450, the third battery 440, the fourth battery 420, and the fifth battery 410, which are combined in the first and second holders 140 and 130, may be connected to each other in series by a plurality of lead tabs 330 through 380 (see FIGS. 5, 6, and 7), and may be electrically connected to the circuit board 200. A battery assembly may be obtained when the plurality of batteries 410 through 450 are accommodated in the first and second holders 140 and 130 and are connected in series by the plurality of lead tabs 330 through 380 (see FIGS. 5, 6, and 7).

Figure 7:
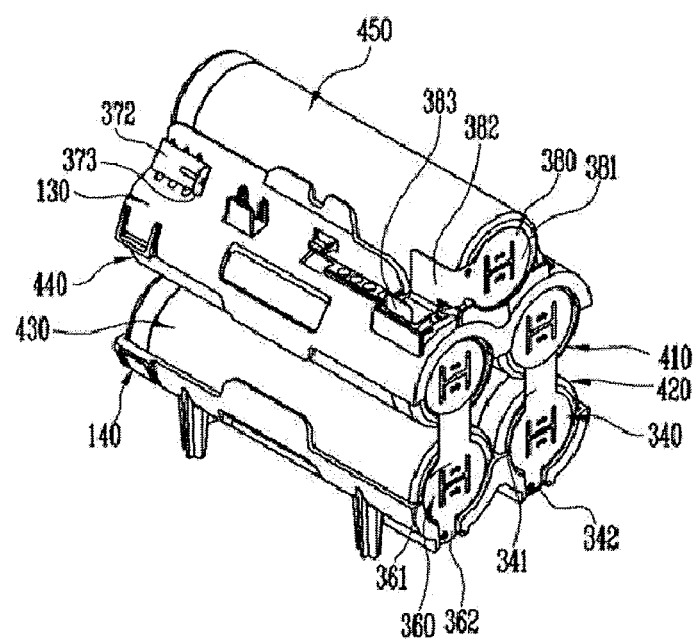
FIG. 7 illustrates an intermediate stage in forming the battery pack, and in particular, illustrates a perspective view of a plurality of batteries that are fixed to a battery holder and then electrically connected to each other by a lead tab.
Figure 8:
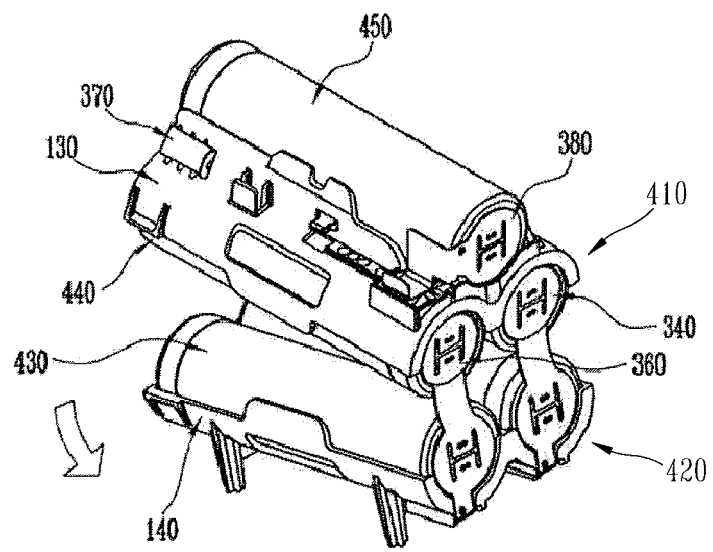
FIG. 8 illustrates an intermediate stage in forming the battery pack, and in particular, illustrates a perspective view of lead tabs of a battery assembly to be assembled as shown in FIG. 6, where some of the lead tabs are bent.

FIGS. 7 and 8 illustrate perspective views depicting intermediate stages of a method of manufacturing the battery assembly. A structure of the battery assembly will now be described with reference to FIGS. 7 and 8. The battery assembly shown in FIGS. 7 and 8 is shown undergoing assembling processes to form battery assembly according to an embodiment is shown in FIGS. 5 and 6.

The plurality of lead tabs 330 through 380 (see FIGS. 5, 6, and 7) may include a first electrode terminal lead tab 330 (see FIG. 6) operating as a first electrode terminal of the plurality of batteries 410 through 450 that are connected in series, and a second electrode terminal lead tab 380 (see FIG. 5) operating as a second electrode terminal of the plurality of batteries 410 through 450. Also, the plurality of lead tabs 330 through 380 may include a first connection lead tab 360 (see FIG. 7) connecting the first and third batteries 430 and 440 in series, a second connection lead tab 370 (see FIG. 6) connecting the third and second batteries 440 and 450 in series, a third connection lead tab 350 (see FIG. 5) connecting the first and fourth batteries 430 and 420 in series, and a fourth connection lead tab 340 (see FIG. 7) connecting the fifth and fourth batteries 410 and 420 in series.

The first electrode terminal lead tab 330 (see FIG. 6) and the second electrode terminal lead tab 380 (see FIG. 5) may respectively include lead bodies 331 and 381 having circular shapes, extending portions 332 and 382 extending from the lead bodies, and bent portions 333 and 383 bent from end portions of the extending portions 332 and 382. In some implementations, a wiring 321, fixed in a mounting position by a guide portion 138, may be connected to the extending portion 332 to connect the first electrode terminal lead tab 330 with the circuit board 200 (see FIGS. 2 and 3). The bent portion 383 (see FIG. 5) of the second electrode terminal lead tab 380 may be electrically connected to the circuit board 200 by being inserted into a connecting portion 226 (see FIG. 4) provided in the protruding surface 220 of the circuit board 200. The bent portion 383 (see FIG. 5) of the second electrode terminal lead tab 380 and the connecting portion 226 provided in the protruding surface 220 may be fixed to each other via welding.

The first through fourth connection lead tabs 360 (see FIG. 7), 370 (see FIGS. 5-6), 350 (see FIG. 5), and 340 (see FIG. 7) may be electrically connected to the circuit board 200 so as to monitor the plurality of batteries 410 through 450. The first through fourth connection lead tabs 360 (see FIG. 7), 370 (see FIGS. 5-6), 350 (see FIG. 5), and 340 (see FIG. 7) may include lead bodies 361 (see FIG. 7), 371 (see FIGS. 5-6), 351 (see FIG. 5), and 341 (see FIG. 7), which electrically connect corresponding batteries, extending portions 362 (see FIG. 7), 372 (see FIGS. 5-6), 352 (see FIG. 5), and 342 (see FIG. 7) extending from the lead bodies 361, 371, 351, and 341, and bent portions 363 (see FIG. 6), 373 (see FIGS. 5-6), 353 (see FIG. 5), and 343 (see FIG. 6) bent from end portions of the extending portions 362, 372, 352, and 342. In some implementations, a wiring 322, fixed in a mounting position by a guide portion 139, may be connected to the extending portion 372 to connect the second connection lead tab 370 to the circuit board 200 (see FIG. 2). The bent portion 363 (see FIG. 6) of the first connection lead tab 360, the bent portion 353 (see FIG. 5) of the third connection lead tab 350, and the bent portion 343 (see FIG. 6) of the fourth connection lead tab 340 may respectively be inserted into connecting portions 216, 217, and 218 (see FIG. 4) provided in the main surface 210 of the circuit board 200.

The bent portion 373 (see FIG. 5) of the second connection lead tab 370 may be electrically connected to the circuit board 200 by being inserted into a connecting portion provided in the protruding surface 220 of the circuit board 200. The connecting portion into which the bent portion 373 (see FIG. 5) of the second connection lead tab 370 is inserted, may be provided in a form like the connection portion 226 and next to the connection portion 226 in the protruding surface 220 of the circuit board 200. The bent portion 373 (see FIG. 5) of the second connection lead tab 370 and the connecting portion provided in the protruding surface 220 may be fixed to each other via welding.

When an end portion of a connection lead tab is bent and inserted into a circuit board, a battery connected to the connection lead tab and the circuit board may be simply electrically connected to each other.

As described above, the circuit board 200 may be electrically connected to the plurality of batteries 410 through 450. The plurality of batteries 410 through 450 may be controlled by at least one device mounted on the circuit board 200.

The circuit board 200 may include the main surface 210 fixed to the first holder 140, and the protruding surface 220 protruding from the main surface 210 and located at the second holder 130. The circuit board 200 may be fixed to the first holder 140 while extending to the second holder 130, and may be electrically connected to the second battery 450 by the second electrode terminal lead tab 380 (see FIG. 5). Accordingly, a shape of the battery assembly may be maintained.

For example, as shown in FIG. 8, the first battery 430 and the fourth battery 420 fixed to the first holder 140 may be rotated in a direction indicated by an arrow, and an intermediate portion between the first and fourth connection lead tabs 360 and 340 may be bent, thereby forming the shape of the battery assembly shown in FIGS. 5 and 6. A lead tab may be formed of a metal and thus may be elastic. The main surface 210 of the circuit board 200 may be fixed to the first holder 140 and the protruding surface 220 of the circuit board 200 may be fixed to the second battery 450 through the second electrode terminal lead tab 380 (see FIG. 5). Accordingly, the shape of the battery assembly of FIGS. 5 and 6 may be maintained.

The at least one device as an example of a circuit mounted on the circuit board 200 and performing a control function may include a protection circuit of the plurality of batteries 410 through 450. The protection circuit may control a voltage or current of a secondary battery so as to not only control charging and discharging, but also protect the secondary battery by blocking over-charging, over-discharging, short-circuit, and an inverse voltage.

For example, in order to configure the protection circuit, the at least one device may include a field effect transistor (FET), a integrated circuit (IC), a positive temperature coefficient (PTC) and a switching device, thereby controlling charging and discharging and blocking a circuit.

By way of summation and review, embodiments provide a compact Battery pack. Embodiments also provide a battery pack that is easily assembled.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery pack, comprising:
    a plurality of cylindrical batteries including a first battery and a second battery, each of the first battery and the second battery including a first electrode at one longitudinal end, a second electrode at an opposite longitudinal end, and a cylindrical side surface between the first electrode and the second electrode; and
    a circuit board including a planar main surface and a protruding surface extending from the main surface in a same plane as the main surface, the main surface being located at the cylindrical side surface of the first battery and the protruding surface extending parallel to the cylindrical side surface of the second battery,
    wherein the protruding surface of the circuit board does not directly contact the second battery, and the second battery is electrically connected to the circuit board through a lead tab connected to the protruding surface.

2. The battery pack as claimed in claim 1, further comprising:
    a connection lead tab electrically connecting the first electrode of the second battery to another one of the plurality of batteries; and
    a second electrode lead tab connected to the second electrode of the second battery,
    wherein at least one of the connection lead tab and the second electrode lead tab is electrically connected to the protruding surface.

3. The battery pack as claimed in claim 1, further comprising:
    a first holder accommodating the first battery; and
    a second holder accommodating the second battery,
    wherein the circuit board is fixed to the first holder via a surface opposite to a surface to which the first battery is fixed, the first holder including a board fixing portion combinable with the main surface of the circuit board.

4. The battery pack as claimed in claim 1, wherein the circuit board includes a circuit to control at least one of charging and discharging of the plurality of batteries.

5. A battery pack, comprising:
    a plurality of cylindrical batteries including a first battery, a second battery, and a third battery which are electrically connected to each other, each of the first battery, the second battery, and the third battery including a first electrode at one longitudinal end, a second electrode at an opposite longitudinal end, and a cylindrical side surface between the first electrode and the second electrode; and
    a circuit board including a planar main surface and a protruding surface extending from the main surface in a same plane as the main surface, the main surface being located at the cylindrical side surface of the first battery and the protruding surface extending parallel to the cylindrical side surface of the second battery,
    wherein the protruding surface of the circuit board does not directly contact the second battery, and the second battery is electrically connected to the circuit board through a lead tab connected to the protruding surface.

6. The battery pack as claimed in claim 5, further comprising:
    a first connection lead tab connecting the second electrode of the first battery and the first electrode of the third battery; and
    a second connection lead tab connecting the first electrode of the second battery and the second electrode of the third battery,
    wherein the first connection lead tab is electrically connected to the main surface of the circuit board, and the second connection lead tab is electrically connected to the protruding surface of the circuit board.

7. The battery pack as claimed in claim 6, further comprising an electrode lead tab connected to the second electrode of the second battery,
    wherein the electrode lead tab is electrically connected to the protruding surface of the circuit board.

8. The battery pack as claimed in claim 6, wherein the first connection lead tab includes:
    a lead body folded in half to have one end portion fixed to the second electrode of the first battery and another end portion fixed to the first electrode of the third battery;
    an extending portion that extends from the lead body; and
    a bent portion that is bent from end portion of the extending portion and inserted into the main surface of the circuit board.

9. The battery pack as claimed in claim 5, further comprising a housing accommodating the plurality of cylindrical batteries and the circuit board,
    wherein the housing includes a first surface facing the circuit board, the first surface being parallel to the circuit board.

10. The battery pack as claimed in claim 9, wherein the housing further includes a second surface facing the second battery, the second surface being located at a side of the first surface.

11. The battery pack as claimed in claim 9, wherein the housing further includes a second surface facing the second battery, the second surface of the housing including a curved surface externally protruding higher than a height of the first surface.

12. The battery pack as claimed in claim 11, wherein the curved surface of the second surface of the housing is parallel to a surface of the second battery that faces the curved surface.

13. The battery pack as claimed in claim 9, further comprising:
    a first holder accommodating the first battery, and accommodating the circuit board at a surface opposite to a surface where the first battery is accommodated; and
    a second holder accommodating the second battery, and accommodating the third battery at a surface opposite to a surface where the second battery is accommodated, wherein the housing further includes a base facing the first battery and the third battery.

14. A battery pack, comprising:
a plurality of batteries including a first battery, a second battery, and a third battery, which are electrically connected to each other;
a circuit board including a main surface and a protruding surface extending from the main surface, the main surface being located at one surface of the first battery and the protruding surface being located at the second battery;
a first connection lead tab connecting a second electrode of the first battery and a first electrode of the third battery, the first connection lead tab including a lead body folded in half to have one end portion fixed to the second electrode of the first battery and another end portion fixed to the first electrode of the third battery, an extending portion that extends from the lead body, and a bent portion that is bent from end portion of the extending portion and inserted into the main surface of the circuit board; and
a second connection lead tab connecting a first electrode of the second battery and a second electrode of the third battery,
wherein:
the second battery is electrically connected to the circuit board through the protruding surface,
the first connection lead tab is electrically connected to the main surface of the circuit board, and
the second connection lead tab is electrically connected to the protruding surface of the circuit board.

15. The battery pack as claimed in claim 14, further comprising an electrode lead tab connected to a second electrode of the second battery,
wherein the electrode lead tab is electrically connected to the protruding surface of the circuit board.

16. The battery pack as claimed in claim 14, further comprising a housing accommodating the plurality of batteries and the circuit board,
wherein the housing includes a first surface facing the circuit board, the first surface being parallel to the circuit board.

17. The battery pack as claimed in claim 16, wherein the housing further includes a second surface facing the second battery, the second surface being located at a side of the first surface.

18. The battery pack as claimed in claim 16, wherein the housing further includes a second surface facing the second battery, the second surface of the housing including a curved surface externally protruding higher than a height of the first surface.

19. The battery pack as claimed in claim 18, wherein the curved surface of the second surface of the housing is parallel to a surface of the second battery that faces the curved surface.

20. The battery pack as claimed in claim 16, further comprising:
a first holder accommodating the first battery, and accommodating the circuit board at a surface opposite to a surface where the first battery is accommodated; and
a second holder accommodating the second battery, and accommodating the third battery at a surface opposite to a surface where the second battery is accommodated,
wherein the housing further includes a base facing the first battery and the third battery.

\* \* \* \* \*